A. BELER.
REGULATING VALVE.
APPLICATION FILED NOV. 12, 1915.

1,309,313.

Patented July 8, 1919.
2 SHEETS—SHEET 1.

Witnesses

Adolf Beler Inventor
by Attorneys

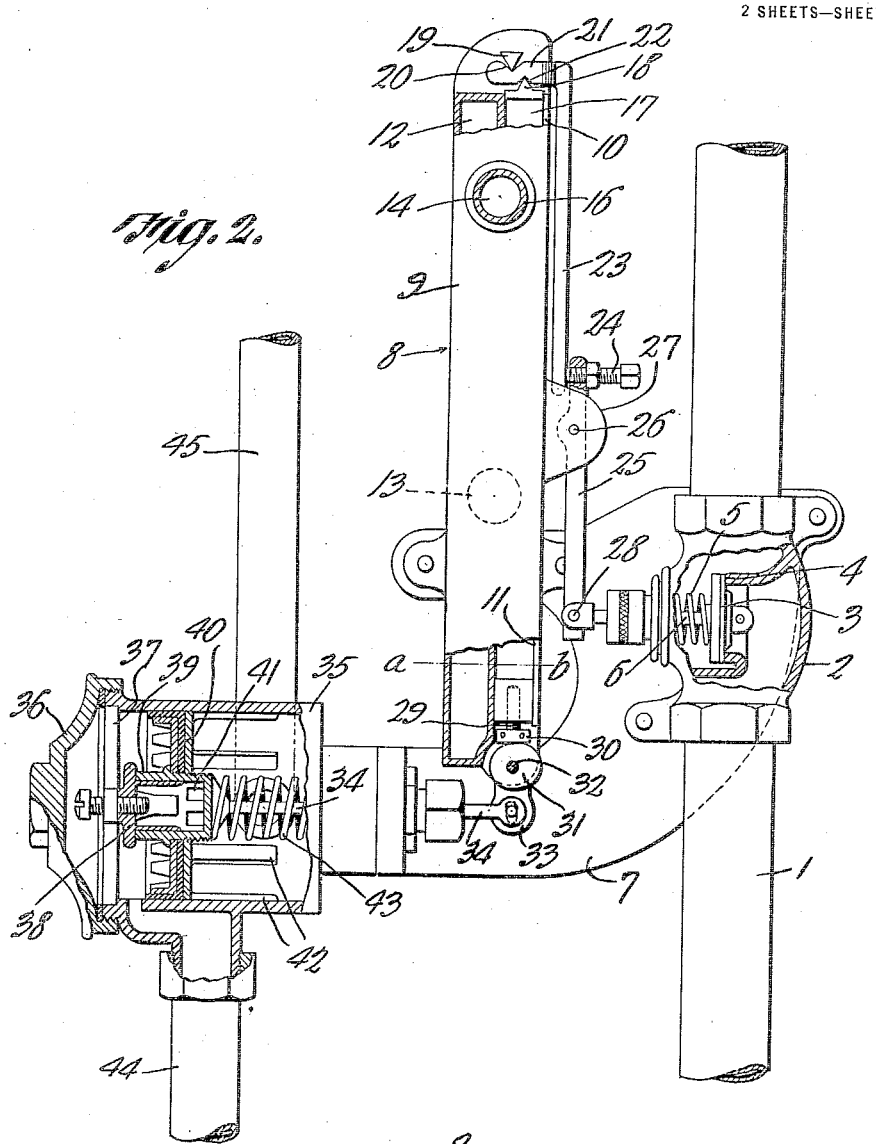

UNITED STATES PATENT OFFICE.

ADOLF BELER, OF PITTSBURGH, PENNSYLVANIA.

REGULATING-VALVE.

1,309,313. Specification of Letters Patent. Patented July 8, 1919.

Application filed November 12, 1915. Serial No. 61,127.

*To all whom it may concern:*

Be it known that I, ADOLF BELER, a citizen of the United States, residing at Pittsburgh, in the county of Allegheny and State of Pennsylvania, have invented a new and useful Regulating-Valve, (Case A,) of which the following is a specification.

This invention relates to regulating valves especially designed as a means whereby liquid, as in a water heater, may be drawn at the desired temperature and at any time, with an economy of fuel, such as gas, the fuel supply being under the direct control of the fluid supply or flow and being, at the same time, under the indirect control of the temperature of the contents of the heater acting through the same agency.

Another object is to provide a thermostat for controlling the action of the fuel supply valve, the thermostat being so mounted as to be entirely free of either compression or tensile strain under normal conditions, thus to eliminate any danger of breakage of the parts.

A further object is to simplify the construction of the mechanism by materially reducing the number of parts employed and by rendering the structure more compact than similar devices heretofore employed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown:

In said drawings:—

Fig. 2 is an enlarged view partly in section and partly in elevation of the regulating apparatus.

Fig. 3 is an enlarged section through one of the members of the thermostat, said section being taken on the line *a—b* Fig. 2.

Figure 1:
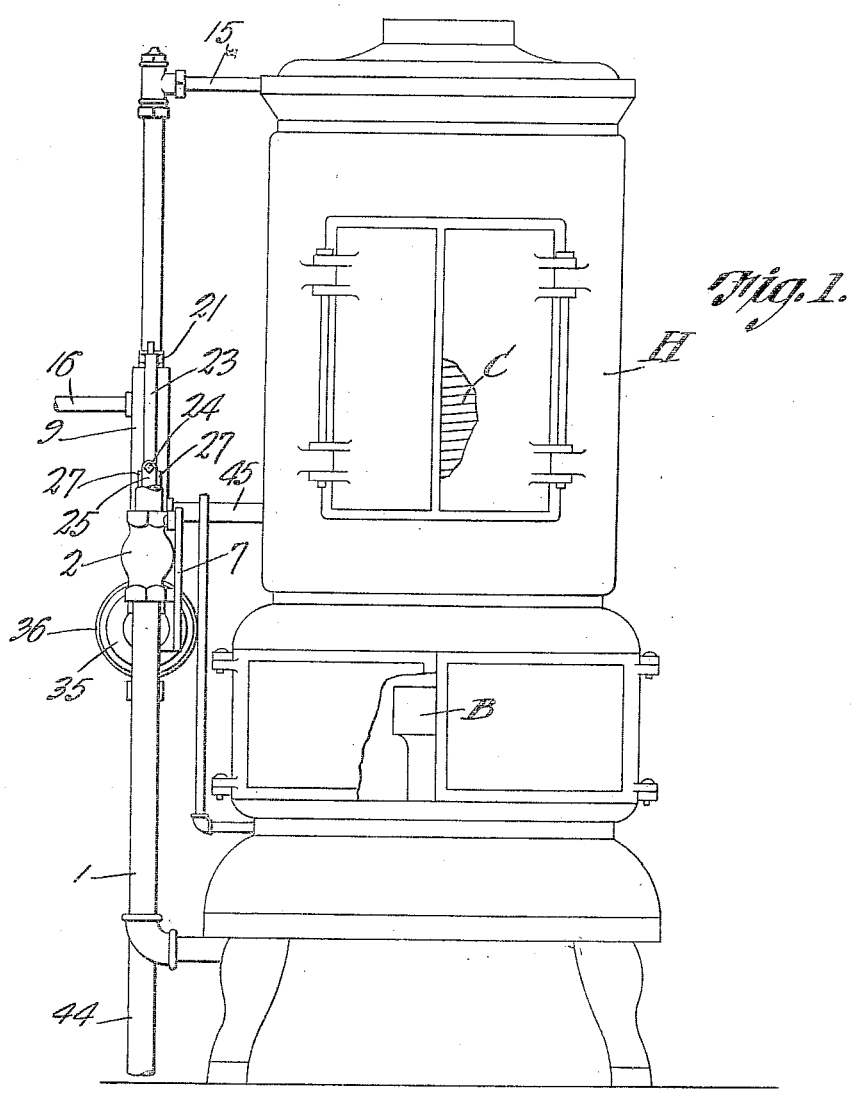
Figure 1 is a front elevation of a heater having combined therewith a regulating valve such as constitutes the present invention, portions of the heater being broken away.

Referring to the figures by characters of reference H designates the heater casing in which is arranged a fluid receptacle, which may be in the form of a coil C, and a burner B. Extending to the burner is a fuel supply conduit 1 embodying a valve casing 2 containing a valve 3 which is normally held upon its seat 4 by a spring 5. This spring is preferably in the form of a coil extending about the stem 6 of the valve, said stem projecting beyond the casing 2. Obviously, when the valve 3 is on its seat, the flow of gas to the burner B is cut off.

The casing 2 is preferably mounted on a backing plate 7 on which is also arranged a thermostat indicated generally at 8. One member of this thermostat is cylindrical, as shown at 9, and has a substantially cylindrical opening 10 extending longitudinally therethrough and eccentric therewith, a longitudinal slot 11 being formed in the wall of the member 9 and communicating with this opening 10. By providing the opening 10, a water chamber 12 is formed in the member 9 and partly about the opening 10, this chamber being crescent-shaped in cross section, as shown in Fig. 3 and extending throughout the length of the thermostat, there being a water inlet 13 in the lower portion of the chamber 12 and a water outlet 14 in the upper portion of said chamber. A pipe 15 leading from the outlet end of the coil C is connected to the inlet 13, while an outflow pipe 16 extending to the point of consumption, leads from the outlet 14. The thermostat member 9 has a high coefficient of expansion. Loosely seated in the opening 10 is a rod 17 of porcelain or other static material (having a low coefficient of expansion), there being a projection 18 at the upper end of this thermostat member 17 while another projection 19 is formed on or secured to the upper portion of the thermally affected member 9. The two projections 18 and 19 are preferably formed with oppositely extended knife edges disposed out of vertical alinement, the projection 19 engaging within a notch 20 formed in the upper edge of a lever 21 while the projection 18 extends into a notch 22 formed in the lower edge of said lever 21 and to one side of the vertical plane in which the notch 20 is located. Lever 21 has an arm 23 extending at an angle therefrom and engaged by an adjusting screw 24 extending through one end of a lever 25. This last named lever is fulcrumed as at 26 between ears 27 outstanding from the thermostat member 9 at opposite sides of the slot 11 and that end of lever 25 remote from screw 24 is pivotally connected to the stem 6 of valve 3, as shown at 28.

The lower end of the thermostat element 17 has a screw 29 extended therefrom, said screw being provided with a head 30 constantly bearing on a cam 31 supported by a bearing pin 32. An arm 33 is extended downwardly from this cam and is adapted to be actuated by a stem 34 mounted for sliding movement in a valve casing 35. This valve casing is connected to the backing place 7 and has one end closed by a removable cap 36 while fitted within the casing and adjacent the cap is a spider 37 to which is secured a disk 38. This disk is normally engaged by the open end of a cylindrical valve 39 the other end of which is closed and has the stem 34 projecting from it. A piston 40 extends about and moves with the valve 39 and slidably engages the wall of casing 35 so as to prevent flow of liquid between valve 39 and the wall of the casing. The valve 39 projects through the piston and that end of the valve extending between the piston 40 and stem 34 has ports 41 in the periphery thereof. Fingers 42 extend from the piston and coöperate with one end of the casing 35 to limit the sliding movement of the piston. A spring 43 is mounted on stem 34 within casing 35 and bears at one end against the valve 39 and at its other end against one end wall of casing 35. This spring serves to hold the valve 39 normally seated upon the disk 38, thus to prevent flow of liquid through the valve and casing.

A liquid supply conduit 44 opens into one end of casing 35 at one side of the piston 40, while a fluid conducting conduit 45 extends from said casing 35 between piston 40 and that end of casing 35 remote from the cap 46. This pipe 45 opens into the lower end of the coil C.

It is to be understood that under normal conditions, when the outlet valve or faucet to which the conduit 16 leads is closed, the water contained between the piston 40 and the faucet or other outlet valve will act as a means for holding said piston 40 against movement under the pressure of the water supplied to casing 35 from the supply pipe 44, spring 43 maintaining valve 39 on its seat 38. With the parts thus positioned, the valve 3 will be held in closed position so that gas cannot flow to the burner B. However, liquid is free to flow from the conduit 14, when its outlet valve or faucet is opened, whereupon resistance to the movement of piston 40 is eliminated. Consequently, the pressure of water admitted to the casing 35 from conduit 44 will be exerted against piston 40 to shift said piston longitudinally of casing 35, thereby removing the valve 39 from its seat 38 and bringing the ends of the fingers 42 against the adjacent end of casing 35. At the same time the spring 43 will be placed under increased compression and the stem 34 will be shifted to rotate cam 31. As soon as valve 39 is shifted out of its normal position, water will flow therethrough and through the ports 41 into that portion of casing 35 back of piston 40 and will then flow outwardly through conduit 45 into the top of the coil C. When stem 34 is shifted with the valve 39, and the cam 31 is rotated, said cam will operate to thrust upwardly against the thermostat member 17, causing the projection 18 on said member to push against the lever 21 and swing arm 23 laterally against the screw 24. Consequently, lever 25 will be shifted to pull through stem 6 upon valve 3, thereby to unseat said valve against the action of the spring 5. Consequently fuel will be free to flow to the burner B where it will be ignited from the pilot, not shown, and the temperature of the water within the coil quickly raised. The heated water upon leaving the coil will flow into the member 9 of the thermostat and will cause said member to expand longitudinally with the result that the projection 19 will move away from projection 18 thus permitting lever 20 to swing back toward its normal position and permitting the arm 23 to swing inwardly away from lever 25. Consequently spring 5 will become active to shift the valve 3 toward or onto its seat 4, thus reducing or entirely cutting off the flow of fuel to the burner. As soon as the flow of water from the pipe 16 has been cut off, spring 43 will return piston 40 and valve 39 to their normal positions, thus pulling through stem 34 on the arm 33 and causing the cam 31 to return to its normal position. Consequently the thermostat element 17 will gravitate to its normal position and all of the parts will be reset. Attention is called to the fact that when the parts are set the thermostat element is not subjected to any compression or to any tensile strain and, consequently, is not likely to become injured. The only time that this member is subjected to any strain is during the actuation of the valve 3.

By means of the apparatus herein described positive control of the flow of gas to the burner is effected. By means of the screw 29 the length of the thermostat element 17 can be regulated and by means of the screw 24 the action of the thermostat apparatus can be rendered as delicate as desired.

What is claimed is:—

1. In a fluid heater, the combination with a receptacle having an inlet and an outlet, a burner for heating the contents of the receptacle, a normally closed fuel supply conduit leading to the burner, coöperating thermally affected and relatively static elements controlled by the heated fluid and normally inactive, means controlled by the pressure of fluid in motion for shifting one of said coöperating elements to open the fuel supply, the other element being stationary and being affected by heat of the fluid to partially or entirely restore the normal relative positions of the elements.

2. In a fluid heater, the combination with a receptacle having an inlet and an outlet, a burner for heating the contents of the receptacle, a normally closed fluid conduit leading to the receptacle, and a normally closed fuel conduit leading to the burner, of coöperating thermally affected and relatively static elements normally inactive, means operated by the movement of fluid in the fluid conduit when said conduit is open, for shifting one of said elements relative to the other, means operated by the relative movement of the element for opening the fuel conduit, and means for leading heated fluid from the receptacle to the thermally affected elements to partially or entirely restore the normal relative positions of the elements, thereby to partially or entirely close the fuel conduit.

3. The combination with a fluid heater including a burner, a normally closed fuel conduit leading to the burner, and means for directing fluid to and from the heater, of coöperating thermally affected and relatively static elements, means operated by the pressure of fluid in motion in the fluid conduit for shifting one of said elements relative to the other, means operated by the movement of said element for opening the fuel conduit, the other element being affected by the heat of the fluid to partially or entirely restore the normal relative positions of the elements, thereby to partly or entirely close the fuel conduit.

4. The combination with a fluid heater having a burner, a normally closed fuel conduit leading to the burner, and a fluid conduit, of coöperating thermally affected and relatively static elements, normally inactive, means operated by fluid in motion in the fluid conduit for shifting one of said elements relative to the other, means operated by the relative movement of said elements for opening the fuel conduit, one of said elements being affected by the heated fluid to compensate for the relative movement of the other element thereby to partially or entirely restore the normal relative positions of the elements to partly or entirely close the fuel conduit, and means for automatically closing said conduit when the movement of the fluid is stopped.

5. The combination with a fluid heater having a burner, a normally closed fuel conduit leading to the burner, and a fluid conduit, of coöperating thermally affected and relatively static elements, normally inactive, means operated by fluid in motion in the fluid conduit for shifting one of said elements relative to the other, means operated by the relative movement of said elements for opening the fuel conduit, one of said elements being affected by the heated fluid to compensate for the relative movement of the other element thereby to partially or entirely restore the normal relative positions of the elements to partly or entirely close the fuel conduit, means for automatically closing said conduit when the movement of the fluid is stopped, and separate means for automatically restoring the shifted element to its normal position upon the stoppage of the fluid.

6. The combination with a fluid heater having a burner, a normally closed conduit leading thereto, and a fluid conduit, of coöperating thermally affected and relatively static elements, means for adjusting said static element as to length, means operated by fluid under movement within its conduit for shifting the static element relative to the other element, means operated by the relative movement of the element for opening the fuel conduit, said thermally affected element being affected by the heated fluid to partially or entirely restore the normal relative positions of the elements, to partly or entirely close the fuel conduit.

In testimony that I claim the foregoing as my own, I have hereto affixed my signature in the presence of two witnesses.

ADOLF BELER.

Witnesses:
R. A. TROOP,
FRED B. FISHER.

Copies of this patent may be obtained for five cents each, by addressing the "Commissioner of Patents, Washington, D. C."